Dec. 13, 1960 W. H. WELLS 2,964,158
MATERIAL LOADING MACHINE
Filed Nov. 3, 1958 2 Sheets-Sheet 1
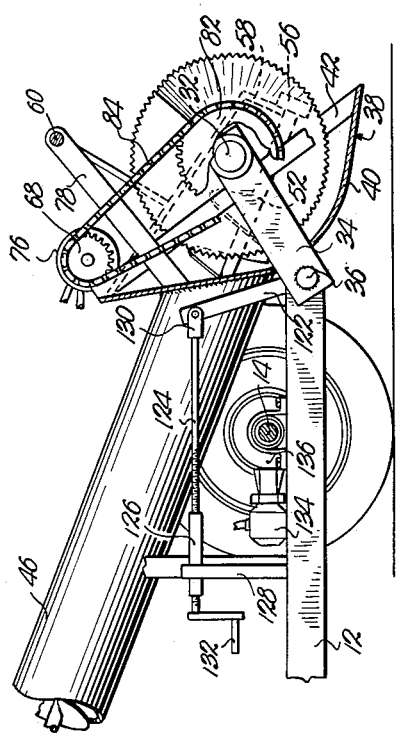
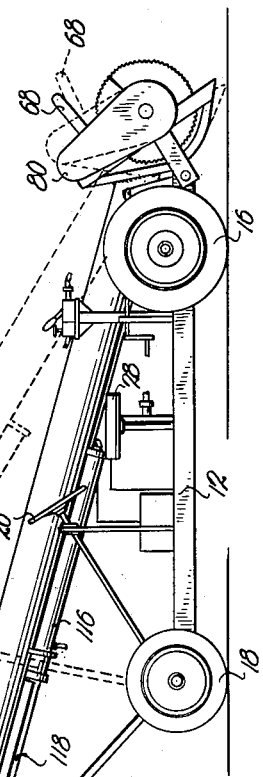
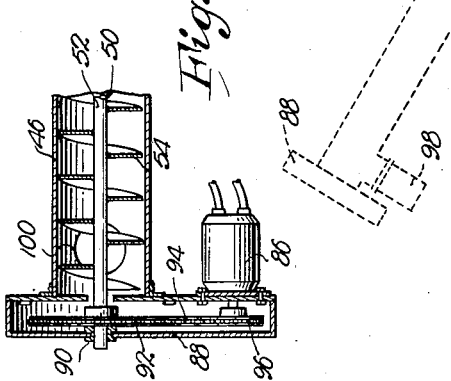
INVENTOR.
William H. Wells
BY
ATTORNEY.

Dec. 13, 1960 W. H. WELLS 2,964,158
MATERIAL LOADING MACHINE
Filed Nov. 3, 1958 2 Sheets-Sheet 2

INVENTOR.
William H. Wells
BY
ATTORNEY.

United States Patent Office 2,964,158
Patented Dec. 13, 1960

2,964,158

MATERIAL LOADING MACHINE

William H. Wells, 1108 Kellam, Topeka, Kans.

Filed Nov. 3, 1958, Ser. No. 771,347

15 Claims. (Cl. 198—7)

This invention relates to a material loading machine and has for its primary object to provide equipment especially adapted for elevating agricultural products from a pile thereof on the ground to an elevated position where the same may be discharged into a suitable storage compartment or conveyance for transporting such material.

It is a further important object of the invention to provide a material handling and loading machine including an elongated helix conveyor rotatably mounted within a tube carried by the frame of the machine in an angular position relative to the ground, as well as a horizontal, auger-type conveyor disposed transversely of the tube at the lower end thereof and adapted for moving material contained in the pile on the ground or other support to a position where the same is engaged by the helix conveyor within the tube and thereby moved upwardly within the latter, thus eliminating the necessity of loading the material by hand and permitting continuous elevation of the material from the ground for discharge through the uppermost end of the tube at a desired height above the ground or support.

An equally important object of the invention is to provide a material loading machine of the character defined above having improved prime mover structure connected to the horizontal auger as well as the inclined helix conveyor within the upright tube, permitting independently variable rotation of the auger and the helix conveyor to prevent jamming of the rotatable components because of inability of the helix conveyor to raise material within the tube at a rate correlated with feeding of material to the lowermost end of the helix conveyor by the auger.

Also an important object of the invention is to provide a material loading machine wherein rotation of the horizontal material feed auger is varied in response to the material load thereon while the elevating helix conveyor is turned at a substantially constant speed, to thereby assure smooth pickup and elevation of the material from the pile thereof without clogging or jamming of the movable parts. A further important object in this respect is to provide variable rotation of the horizontal feed auger relative to the elevating helix conveyor by utilization of hydraulically operated motors coupled with the auger and helix conveyor respectively, with the fluid supply system connected to the motor for the feed auger being provided with a by-pass system for shunting at least a portion of the fluid normally directed to such motor past the same in order to vary the speed of the feed auger in response to the material load on the same.

An important object of the invention is to provide a material loading machine having mechanism for raising and lowering the horizontal feed auger and thereby the scoop associated therewith as well as the elevating tube relative to the ground and without interfering with the structure for varying the angularity of the elevating tube whereby the material may be picked up and elevated from the most advantageous location.

Other important objects of the invention relate to the provision of a material loading machine including a scoop mounted on the frame thereof in a position relative to the horizontal feed auger to guide the material engaged by the feed auger into a position where the same may be readily picked up by the elevating feed conveyor and which scoop also serves to break up and agitate compacted material on the ground or support as the machine is moved toward the piled material; to the provision of a machine wherein the inclined elevating conveyor assembly is adjustably mounted on the main frame of the unit to permit change of the angularity of the elevating assembly relative to the ground; to the provision of a machine wherein the frame thereof is supported by wheels, thereby making the machine mobile; to the provision of a machine wherein the various movable components are adapted to be operated by individual hydraulic motors in turn actuated by fluid from corresponding separate pumps driven from a common power source such as a gasoline engine, and thus permitting the various movable components to be individually actuated while the engine continues to run; to an attachment for the material loading machine especially useful in picking up and elevating ensilage type products with an auxiliary conveyor assembly being provided for picking up and directing the material to the horizontal feed auger from elevated points remote from the feed auger; to the provision of a machine wherein the prime mover for driving the inclined elevating conveyor is located at the uppermost end of the tube for such conveyor to thereby eliminate any components and mechanism at the intake of the elevating conveyor which would impede upward movement of material within the tube; and to other important objects and details of construction of the instant invention which will become obvious or be explained more fully as the following specification progresses.

In the drawings:

Figure 1 is a side elevational view of a material loading machine embodying the concepts of the instant invention, with certain parts thereof being broken away to reveal details of construction and alternate positions of the elevating conveyor being shown in phantom;

Fig. 2 is an enlarged, fragmentary, side elevational view of the pickup mechanism of the instant loading machine, with the housing over certain parts of the drive assembly thereof being removed to reveal the parts thereunder and other elements being broken away to more clearly illustrate the details of the mechanism thereunder;

Fig. 3 is an enlarged, fragmentary, cross-sectional view taken substantially on the line 3—3 of Fig. 1 and looking downwardly in the direction of the arrows;

Figure 4:
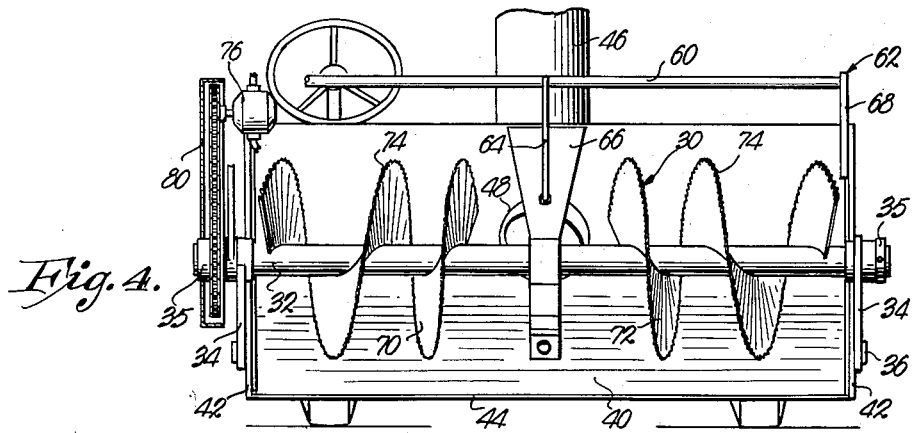
Fig. 4 is an enlarged, end elevational view of the material loading machine with the housing over the drive mechanism for the horizontal feed auger being in section to show the components contained therewithin.

A material loading machine broadly numerated 10 and illustrated in the drawings in its preferred form, includes a horizontal, box-like frame 12 supported at its rearmost end by transversely extending axles 14 provided with a pair of outboard wheels 16 thereon, while a pair of front wheels 18 of somewhat smaller diameter than wheels 16 are secured to the froward part of frame 12 by respective kingpin assemblies 20 permitting wheels 18 to rotate about vertical axes. Tie rod 22 interconnecting assemblies 20 and operably coupled with steering mechanism 24 permits guiding of wheels 18 by steering wheel 26 adjacent a seat 28 carried by frame 12 intermediate the ends thereof.

Means mounted on frame 12 for picking up and elevating materials disposed on the ground or a horizontal support includes an elongated, horizontally disposed feed auger broadly designated 30 and having a central shaft 32 rotatably carried at opposite ends thereof by bearings 35 disposed in coaxially alignment and secured to the outer end of a pair of parallel, elongated mounting arms 34, in turn rigidly secured to a shaft 36 rotatably mounted on the rearmost end of frame 12, as best shown in Fig. 2.

Arms 34 are located adjacent respective outermost ends of shaft 32 as well as shaft 36 and serve as means for mounting a scoop broadly numerated 38 formed of an arcuate sheet 40 extending the entire distance between arms 34 and located with the concave face thereof away from frame 12 and in partially surrounding relationship to feed auger 30. Reinforcing members 42 interconnecting opposed upper and lower margins of sheet 40 at the end edges thereof are also welded intermediate their ends to respective arms 34 to increase the rigidity of scoop 38. It is to be noted that the lowermost, longitudinally extending edge 44 of sheet 40 is relatively sharp to thereby serve as a scarifier to loosen material piled on the ground in a compacted form and which would otherwise be difficult for auger 30 to pick up during a loading operation.

An elongated elevating tube 46 is carried by frame 12 with the lower end thereof welded to the rear convex face of sheet 40 intermediate mounting arms 34 and communicating with the concave side of scoop 38 through an opening 48 in sheet 40. A helix conveyor rotatably mounted within tube 46 has an elongated shaft 52 having a spirally wound vane 54 thereon of a diameter substantially equal to the inside diameter of tube 46 to thereby elevate material within tube 46 during operation of machine 10. The lower end of shaft 52 is rotatably received within a bearing 56 carried by an L-shaped bracket 58 connected at the uppermost end thereof to the inner face of sheet 40 adjacent the upper margin thereof and also suspended from transversely extending bar 60 of guard structure 62 by a cross member 64. As illustrated in Fig. 4, the lower end of cross member 64 is attached to a polygonal shaped plate 66 forming a part of bracket 58 and which is secured to sheet 40 in overlying relationship to opening 48 and terminating adjacent shaft 32. Guard structure 62 includes a pair of upright elements 68 welded to the inner concave face of sheet 40 adjacent respective side edges thereof and interconnected at the outermost ends of the same by bar 60. Guard structure 62 substantially overlies feed auger 30 and prevents objects from damaging the same.

Left and right-hand, spirally wound vanes 70 and 72 respectively secured to shaft 32 on opposed sides of opening 48 serve to feed material disposed on the ground or a horizontal support toward helix conveyor 50 during rotation of shaft 32 in one direction. In order to increase the utility of machine 10, it is to be preferred that the peripheral edges 74 of each of the vanes 70 and 72 respectively be serrated to not only assure feeding of all types of materials toward helix conveyor 50 but also operating to break up relatively hard masses of compacted material. Mechanism for rotating shaft 32 in the defined direction comprises a hydraulic motor 76 mounted on scoop 38 for movement therewith and operably coupled with a sprocket wheel 78 rotatably mounted within a housing 80 also secured to scoop 38 and a proximal mounting arm 34. Sprocket wheel 78 is operably coupled with a somewhat larger sprocket wheel 82 secured to shaft 32, through provision of an endless chain 84 trained over wheels 78 and 82 respectively. Means for actuating motor 76 to drive feed auger 30 will be described in detail hereinafter.

It is to be noted that helix conveyor 50 is also driven by a hydraulic motor 86 secured to a pear-shaped housing 88 mounted on the normally uppermost end of tube 46. The uppermost end of shaft 52 extends outwardly from the upper end of tube 46, into and through housing 88 as shown in Fig. 3. Bearing 90 carried by housing 88 and rotatably receiving the upper end of shaft 52 maintains the latter in coaxial alignment with tube 46. Sprocket wheel 92 secured to the upper end of shaft 52 within housing 88 is operably coupled with motor 86 through an endless chain 94 trained over sprocket wheel 92 and another wheel 96 on the drive shaft of hydraulic motor 86. A downwardly discharging chute 98 is secured to tube 46 adjacent housing 88 and communicates with the interior of tube 46 through an opening 100 in the normally lowermost face of tube 46 and in slightly spaced relationship to housing 88.

Structure for raising and lowering tube 46 relative to frame 12 and thereby the ground, preferably comprises a pair of angularly disposed rods 102 converging as their uppermost ends are approached and interconnected adjacent such upper ends by a cross member 104. The lower ends of rods 102 are rotatably received by identical, horizontally spaced, upright brackets 106 welded to frame 12 at the forwardmost end thereof adjacent wheels 18. Brackets 106 are aligned transversely of frame 12 to permit rods 102 to pivot about a common horizontal axis. A shaft 108 spanning the distance between the uppermost ends of rods 102 above cross member 104 mounts a pair of horizontally rotatable, spaced rollers 110 received by respective parallel tracks 112 welded to the underface of tube 46 in longitudinally extending relationship. Hook portions 114 integral with respective tracks 112 at each end thereof are adapted to receive rollers 110 and thereby restrict pivoting of rods 102 about brackets 106. An elongated hydraulic cylinder 116 mounted beneath and on tube 46 in direct overlying relationship to frame 12 has a reciprocable piston 118 therein pivotally joined at its outermost end to shaft 108 by a bearing connector 120.

Mechanism is also provided for raising and lowering scoop 38 and thereby the components associated with the same relative to the ground and which may comprise a crank arm 122 rigidly connected to shaft 36 at its lowermost end and pivotally joined to an adjusting screw 124 at the upper end thereof. As indicated in Fig. 2, adjusting screw 124 is threaded into a sleeve 126 carried by an upright bracket 128 on frame 12, while the end of screw 124 adjacent arm 122 is freely rotatable within a connector 130 pivotally joined to arm 122. Operating handle 132 on the end of screw 124 adjacent sleeve 126 facilitates rotation of adjusting screw 124 to thereby pivot mounting arms 34 and the structure carried thereby about the axis of shaft 36.

A third hydraulic motor 134 carried by frame 12 is operably connected to differential 136, in turn operably coupled with axles 14.

Figure 6:
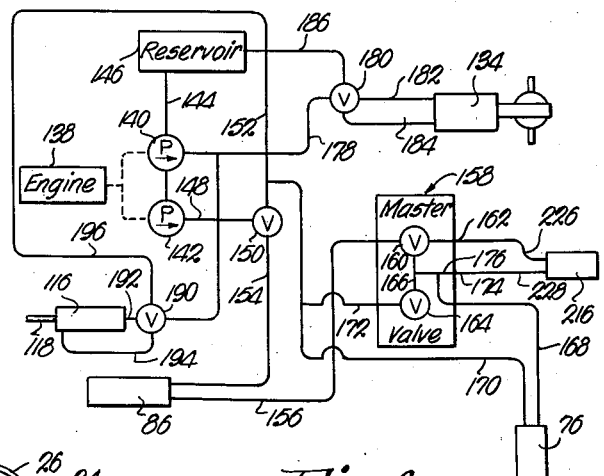
Fig. 6 is a schematic chart of the hydraulic system and motors utilized to drive the rotatable and movable parts of the present loading machine.

As explained above, hydraulic motors 76, 86 and 134 are adapted to be driven by a common power source such as an internal combustion engine 138, the hydraulic system actuated during operation of engine 138 being shown schematically in Fig. 6. Separate hydraulic pumps 140 and 142 are operably coupled with the drive shaft of engine 138 whereby, during operation of the latter, the defined hydraulic pumps are also actuated therewith. Pump 140 is designed for providing power for operating motor 134 and hydraulic cylinder 116, while pump 142 is adapted to actuate hydraulic motors 76 and 86 as well as a motor 216, to be defined more fully hereinafter. It is to be recognized, however, that in lieu of the two pumps 140 and 142, a single pump of sufficient capacity may be employed to drive all of the hydraulic mechanism of the instant machine. A supply line 144 connected to fluid reservoir 146 supplies hydraulic fluid to pumps 140 and 142, with conduit 148 intercommunicating the outlet of pump 142 with the inlet of a two-way valve 150. One outlet of valve 150 is connected by a line 152 to the return orifice of reservoir 146, while a conduit 154 connected to the other outlet opening of valve 150 intercommunicates the latter with the inlet of hydraulic motor 86. The return line 156 of motor 86 is connected to the inlet of a master control valve broadly designated 158 and provided with a two-way valve 160 having one outlet thereof communicating with a quick-disconnect, hose receptacle 162, while the other outlet of valve 160 is connected to the inlet of a variable flow valve 164 by a line 166. Conduit 168 intercommunicates line 166 with the inlet of motor 76 while fluid return line 170 is connected to the outlet of motor 76 and line 152 downflow from valve 150. By-pass line 172 interconnecting the outlet of variable flow valve 164 and return line 170 permits fluid to flow into line 152 in by-passing relationship to motor 76 under conditions to be described more clearly hereinafter. The quick-disconnect inlet receptacle 174 of master control valve 158 is connected to conduit 168 by a relatively short line 176. It should be noted that valve 164 is of the type permitting selective control of the flow of fluid therethrough, yet permitting full flow when the back pressure from motor 76 exceeds the spring or diaphragm tension within valve 164. Various types of pressure responsive valves may be employed for valve 164 in master control valve 158 so long as they are of the type permitting variable flow of fluid in by-passing relationship to motor 76, yet permitting greater flow therethrough when the back pressure from motor 76 increases because of the load on auger means 30.

Line 178 leading from pump 140 is connected directly to a valve 180 of the type permitting flow of fluid from pump 140 either into line 182 leading to motor 134 or, in the alternative, to line 184 directed in the opposite side of motor 134. Return line 186 intercommunicates the outlet of valve 180 with return line 152 in turn communicating with reservoir 146. A branch line 188 connected to line 178 downflow from pump 140 communicates with a valve 190 permitting flow of fluid to one end of cylinder 116 by a line 192 or to the opposite end of cylinder 116 by conduit 194, while fluid return line 196 intercommunicates the outlet of valve 190 with return line 152.

In operation of machine 10, engine 138 is initially started to operate pumps 140 and 142 to thereby permit controlled actuation of the hydraulic components of machine 10. Assuming that valve 150 is initially in a position to divert fluid into return line 152, and valve 190 is located to cause fluid to flow directly into return line 196, it can be seen that machine 10 can be moved forwardly or rearwardly as desired by merely operating valve 180 to cause fluid from pump 140 to flow into motor 134 via line 178 and either line 182 or 184, depending upon which direction it is desired to move machine 10. The speed of advancement or backing of machine 10 may be selectively controlled by the operator by the extent to which valve 180 is opened to permit flow of fluid into motor 134. Furthermore, the machine may be stopped by merely turning valve 180 to a position diverting the fluid directly into return line 186 in by-passing relationship to motor 134.

After machine 10 has been moved to a desired position in proximity to a pile of material to be raised to an elevated height, valve 150 is turned to a position causing fluid to flow through conduit 154 from conduit 148 connected to pump 142. Fluid flowing into motor 86 via conduit 154 causes the elevating conveyor 50 to be rotated, and the line 156 conveys the fluid from motor 86 directly into valve 160 within master control valve 158. Assuming that valve 160 is in a position to cause the fluid to flow into conduit 168 via line 166, it can be seen that motor 76 is actuated in response to flow of fluid while the latter then is directed into return line 152 via line 170. The actuation of motor 76 causes horizontal feed auger means 30 to be rotated and the rate of rotation will be dependent upon the setting of valve 164 and the amount of fluid which is permitted to flow through by-pass line 172 into return line 170 and in shunting relationship to motor 76.

As motors 76 and 86 are operated, shaft 32 is rotated through sprocket wheel 82 operably coupled with sprocket wheel 78 on motor 76 through endless chain 84, while shaft 52 of helix conveyor 50 is rotated by motor 86 through sprocket wheel 96 thereon operably coupled with sprocket wheel 92 on shaft 52 by endless chain 94. Rotation of shaft 32 causes spiral vanes 70 thereon to move material in the pile toward the central part of scoop 38 where the spiral vanes 54 on shaft 52 engage the material and elevate the same within tube 46 as helix conveyor 50 is rotated within the elevating tube. When the material reaches the uppermost end of tube 46, the same is discharged downwardly through chute 98 into a suitable receptacle or means of transportation.

The operator of machine 10 controls the same from a position on seat 28 and not only may machine 10 be moved forwardly or backwardly as necessary to pick up the material from the ground but, furthermore, the machine may be easily maneuvered as required by merely turning steering wheel 26 which simultaneously effects turning of front wheels 18 in response to steering mechanism 24 coupled with tie rod 22, thereby moving front wheels 18 about the vertical axes of corresponding kingpin assemblies 20.

Scoop 38 serves the important function of guiding the material toward opening 48 in sheet 40 as spiral vanes 70 are rotated with shaft 32 and furthermore, scoop 38 acts as a backing member to permit the operator of machine 10 to move scoop 38 into engagement with the pile of material to cause feed auger 30 to shift the material to a position where the same can be readily picked up by helix conveyor 50. Polygonal plate 66 serves the important function of effecting packing of the material beneath the same during rotation of feed auger 30, whereby a maximum amount of material is received and picked up by conveyor 50 for movement upwardly within tube 46. It should also be noted that spiral vanes 70 and 72 have a pair of spiral sections adjacent conveying auger 50 in closer relationship than the outer spiral section of each vane, to thereby assure even distribution of the material to elevating auger 50 without jouncing of the material which would decrease the quantity of material picked up by elevating conveyor 50. Winding of vanes 70 and 72 on shaft 32 in the manner clearly shown in Fig. 4 causes even conveyance of material horizontally to a position where the same is packed beneath plate 66 and readily picked up by helix conveyor 50.

The vertical elevation of tube 46 depends upon the height to which it is desired that the material be raised, and raising and lowering of tube 46 to change the elevation thereof is effected by shifting valve 190 to positions permitting fluid from pump 140 to be directed from line 188 either into line 192 or conduit 194.

As piston 118 is reciprocated within cylinder 116, the fluid therein returns to reservoir 146 via return line 196, and shaft 108 is reciprocated to cause rollers 110 to roll on respective tracks 112 and thereby pivot rods 102 about brackets 106. The elevation of tube 46 is changed as the effective height of rods 102 is varied during reciprocation of piston 118.

After tube 46 has been positioned at a desired level, it is desirable that scoop 38 be moved into relatively close proximity with the ground and this is readily effected by rotating screw 124 with handle 132 to thereby pivot crank arm 122 and mounting arms 34 about the axis of shaft 36. Rotation of mounting arms 34 about shaft 36 moves the entire mechanism carried by such arms toward and away from the ground, as can best be seen in Fig. 2. It is also to be understood that arms 34 may be of any desired length depending upon the type of loading operation which is to be carried out with machine 10, and if the latter is to be especially adapted for loading materials from relatively high docks or the like, arms 34 should be of substantial length to thereby maintain feed auger 30 in a relatively high location with respect to the ground. Similarly, rods 102 should be substantially longer to maintain the uppermost end of tube 46 at an elevated location relative to the feed mechanism at the rear end of machine 10.

It is to be noted that the edge 44 of scoop 38 may be relatively sharp to permit such edge to be moved beneath the material piled on the ground and also may be utilized to rake up compacted material. In this respect, serrated edges 74 on spiral vanes 70 and 72 are of material value in permitting feed conveyor 30 to pick up relatively compacted materials and particularly ensilage or the like.

A very important feature of the invention is the provision of variable flow valve 164 intercommunicating line 166 with return line 170 whereby a variable quantity of fluid may be shunted past motor 76 to vary the speed of rotation of shaft 32 and vanes 70 and 72 thereon. The greater the quantity of fluid permitted to by-pass motor 76, the slower shaft 32 is rotated and by the same token, if the load on feed auger 30 should materially increase because of the failure of helix conveyor 50 to pick up such material as fast as it is fed to the lower end of the same beneath plate 66, the increased pressure on motor 76 and thereby the fluid flowing into the same causes valve 164 to open to a greater extent and permits more fluid to by-pass motor 76 through line 172. Thus, the mechanism within master control valve 158 automatically compensates for excessive loads on shaft 32 and permits even feeding of material to helix conveyor 50 without constant operator attention in this respect being required. Also, it prevents damage to feed auger 30 which would otherwise occur if constant pressure was maintained on motor 76. Since different materials require feed auger 30 to be driven at various speeds, it can be recognized that the exact speed of rotation of feed auger 30 required to effect the most efficient pickup and elevation of the material may be accomplished because of the infinitely variable rate at which shaft 32 may be driven through motor 76.

Figure 5:
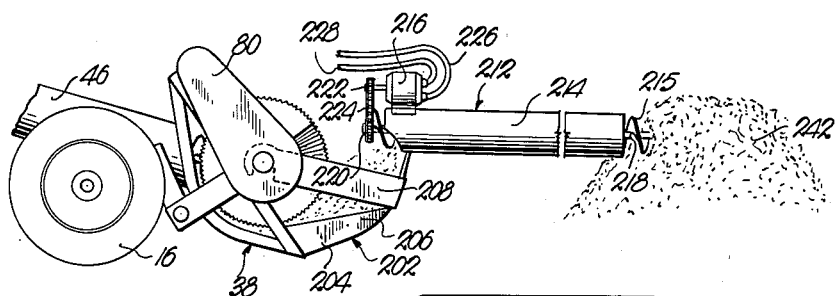
Fig. 5 is a fragmentary, side elevational view of the machine illustrating an attachment therefor permitting loading of different types of material.
Figure 7:
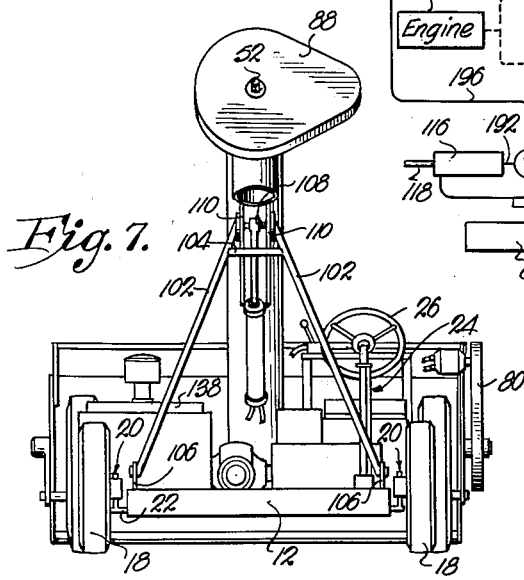
Fig. 7 is an end elevational view of the loading machine showing the end thereof opposed to that illustrated in Fig. 4.

An attachment for machine 10 is shown in Fig. 5, permitting loading of materials from positions where it is impractical to move feed auger 30 into contacting relationship with the pile of material, the illustrated attachment being particularly useful in emptying trucks and removing material from round bins and freight cars. Secondary scoop unit 202 forming a part of the attachment has a transversely arcuate panel 204 of approximately the same longitudinal length as sheet 40 and is provided with substantially triangular bracing members 206 at each end thereof welded to the side edges of panel 204 to maintain the same in proper curved relationship. Opposed, parallel arms 208 welded to panel 204 in parallel, overlying relationship to respective members 206 have hook portions 210 integral with the outermost ends thereof and adapted to be disposed over portions of the bearings carrying shaft 32 to thereby releasably maintain scoop unit 202 on scoop 38 and cooperating with the latter to present an upwardly facing, elongated trough as indicated in Fig. 5.

An auxiliary, elongated, tubular conveyor assembly 212 is provided with a tube 214 rotatably housing a helix conveyor 215 extending outwardly beyond respective ends of tube 214, as indicated in the drawings. Although not specifically illustrated, it is to be understood that hydraulic cylinder means operably interconnecting tube 214 with secondary scope 202 may be provided for effecting horizontal and vertical movement of conveyor 212 relative to machine 10, and such hydraulic cylinder means may be driven by the hydraulic mechanism on frame 12. It is to be preferred, in this respect, that the cylinders for moving conveyor mechanism 212 be operably coupled with pump 140 in a manner similar to the way in which cylinder 116 is actuated by pump 140.

Hydraulic motor 216 mounted on one end of tube 214 is operably coupled with the shaft 218 of conveyor 215 by a sprocket wheel 220 secured to shaft 218 and operably coupled with sprocket wheel 222 on motor 216 by a chain drive unit 224. The end of conveyor assembly 212 having motor 216 thereon is positioned on the upper marginal edge of panel 204 adjacent opening 48, and means is provided as indicated above, but not illustrated, for releasably securing tube 214 to scoop unit 202.

Quick-disconnect line 226 coupled with the inlet of motor 216 is adapted to be received within receptacle 162 of master valve 158, while quick-disconnect return line 228 of motor 216 is adapted to be coupled with receptacle 164. With lines 226 and 228 connected to receptacles 162 and 174 respectively, fluid may be diverted to motor 216 by moving valve 160 to a position permitting fluid from line 156 to flow directly into line 226. Under this arrangement, motors 86 and 216 are driven at constant speeds while motor 76 is again driven at a variable rate, inasmuch as motor 76 is located downflow from motor 216.

During operation of motor 216, helix conveyor 215 is rotated to thereby cause material from pile 242 to be passed through tube 214 into the trough presented by scoop unit 202 and scoop 38. Upon discharge of the material from tube 214 into the defined trough, feed auger 30 directs the product toward opening 48, whereupon helix conveyor 50 elevates such material to a desired height for discharge through chute 98.

Having thus described the invention what is claimed as new and desired to be secured by Letters Patent is:

1. In a material loading machine, a frame; an elongated tube mounted on the frame in an angular position relative to the ground and with one end thereof in proximity to the same; a helix conveyor rotatably mounted within the tube and extending substantially the entire length of the latter for elevating material and discharging the same through the upper extremity of the tube, the lower end of the conveyor projecting outwardly from said lower end of the tube to receive material disposed in a pile; a shaft disposed transversely of the tube at said lower end thereof, substantially parallel to the ground and provided with spiral vanes on opposed sides of said lower end of the conveyor, said vanes being oppositely wound about the shaft in directions to move material in said pile and received by said vanes toward and into a position to be engaged by said lower end of the conveyor as the shaft is rotated in one direction; a scoop carried by the frame in partial surrounding relationship to the vanes and disposed to receive and guide the material as the latter is moved toward the tube by the vanes during rotation of the shaft; separate power means operably connected to the shaft and said conveyor respectively for rotating the same to raise material from said pile to an elevated position; and control means operably coupled to both of said power means for permitting operation of the latter and thereby the rate of rotation of said shaft and conveyor respectively to be selectively varied, said control means including structure for automatically varying the rate of rotation of the shaft relative to said conveyor in response to increase of the material load on said shaft to prevent jamming of the latter with said material and while said shaft continues to rotate at substantially the initial selected speed thereof.

2. A material loading machine as set forth in claim 1 wherein said power means includes individual prime movers operably connected to said shaft and the conveyor respectively for permitting rotation of the latter at proportional selectively variable speeds.

3. A material loading machine as set forth in claim 2 wherein the prime mover connected to said shaft includes a hydraulic motor, there being a fluid supply system coupled with said motor and means in said system for varying the supply of fluid to said motor in response to the material load on said shaft.

4. A material loading machine as set forth in claim 3 wherein said means in the system for varying the supply of fluid to the motor includes a by-pass line having a pressure responsive valve therein for permitting at least a portion of the fluid to by-pass said motor when the material load on said shaft exceeds a predetermined level.

5. A material loading machine as set forth in claim 1 wherein is provided structure connected to said tube and carried by the frame for varying the angularity of the tube relative to the ground, said scoop being secured to the lower end of said tube for movement therewith.

6. A material loading machine as set forth in claim 5 wherein said structure includes a pair of tracks secured to the normally under surface of said tube intermediate the ends thereof and disposed in longitudinally extending parallel relationship to the tube, a pair of upright members pivotally mounted at the lower end thereof on the frame and having rollers on the upper end thereof engaging and movable on respective tracks and power actuated mechanism independent of said power means and connected to said members for moving the latter relative to the tube to shift the rollers on said tracks and thereby effect raising or lowering of the tube relative to the ground.

7. A material loading machine as set forth in claim 6 wherein said mechanism includes a hydraulic piston and cylinder assembly, the cylinder being rigidly secured to said tube and the piston being coupled with said members.

8. A material loading machine as set forth in claim 1 wherein the outer spiral edge of each of the vanes is serrated to facilitate loading of ensilage type materials.

9. A material loading machine as set forth in claim 1 wherein the outer, normally lowermost, transversely extending margin of the scoop is relatively sharp whereby the latter may be utilized as a scarifier to loosen compacted material in said pile during loading of the material with said machine.

10. A material loading machine as set forth in claim 1 wherein the power means for rotating the shaft includes a prime mover carried by the tube at the uppermost end thereof and operably coupled with the upper end of said conveyor.

11. A material loading machine as set forth in claim 10 wherein said prime mover is a hydraulically operated motor, there being a fluid supply system on the frame and connected to said motor for supplying fluid to the same to rotate the conveyor.

12. A material loading machine as set forth in claim 1 wherein is provided a secondary unit mounted on the frame in engagement with said scoop and cooperating with the latter to present an upwardly facing trough and wherein is included an auxiliary, elongated, tubular conveyor assembly disposed with the discharge end thereof overlying said trough and the intake end thereof extending away and located remote from the trough, said assembly having an auger rotatably mounted therein and a prime mover coupled with said auger for rotating the latter, the intake end of the assembly being movable in a plurality of directions to thereby permit material to be picked up through said intake end of the assembly at a desired angle and elevation relative to said trough.

13. A material loading machine as set forth in claim 12 wherein said prime mover connected to the auger is actuated by power means located on said frame.

14. A material loading machine as set forth in claim 1 wherein is provided wheel means supporting the frame on the ground and power means coupled with certain of the wheels for rotating the latter to move the loader.

15. A material loading machine as set forth in claim 1 wherein is provided mechanism connected to said shaft for raising and lowering the latter and wherein said tube and the scoop are carried by said shaft for movement therewith.

References Cited in the file of this patent

UNITED STATES PATENTS

| | | |
|---|---|---|
| 2,390,286 | Adams | Dec. 4, 1945 |
| 2,425,695 | Fees | Aug. 12, 1947 |